Figure 4:
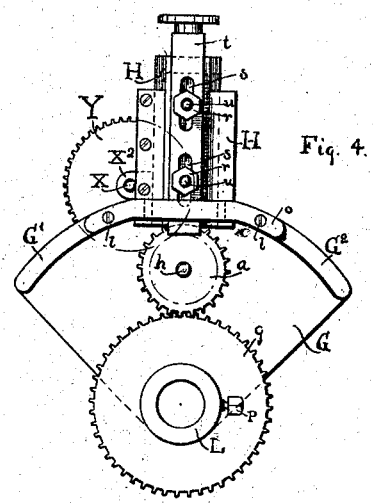

No. 681,071. Patented Aug. 20, 1901.
C. F. OWEN.
MACHINE FOR TURNING OFF CRANK PINS, &c.
(Application filed July 19, 1899.)
(No Model.) 3 Sheets—Sheet 1.
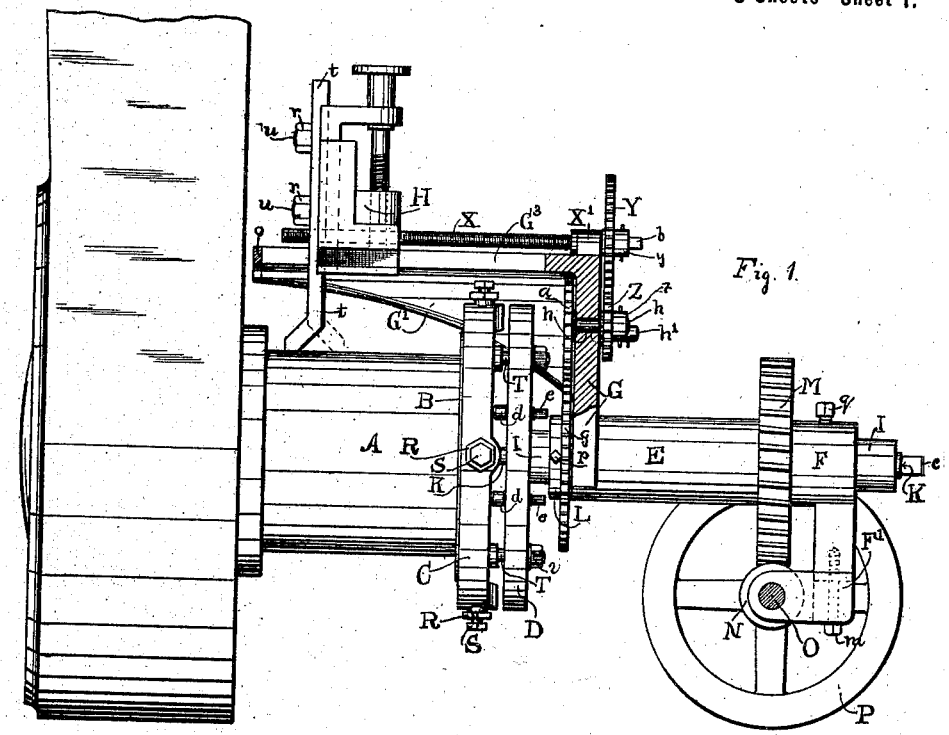
Fig. 1.
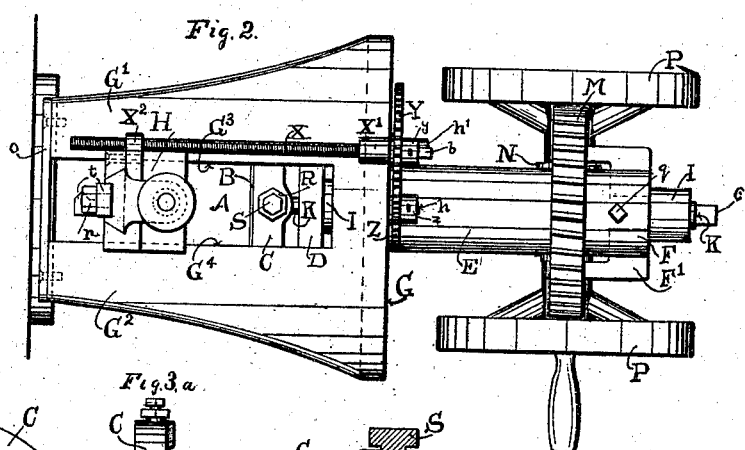
Fig. 2.
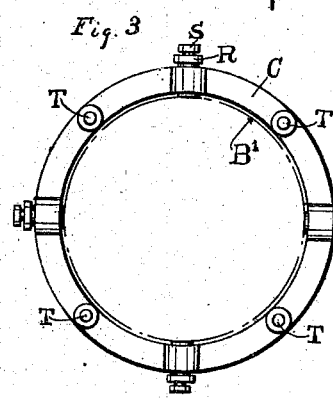
Fig. 3.
Fig. 3.a
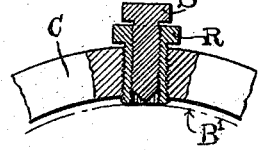
Fig. 3.b
Witnesses: Inventor:
Charles F. Owen No. 681,071. Patented Aug. 20, 1901.
C. F. OWEN.
MACHINE FOR TURNING OFF CRANK PINS, &c.
(Application filed July 19, 1899.)
(No Model.)
3 Sheets—Sheet 2.

Witnesses:
Inventor:
Charles F. Owen

THE NORRIS PETERS CO., PHOTO-LITHO., WASHINGTON, D. C.

No. 681,071. Patented Aug. 20, 1901.
C. F. OWEN.
MACHINE FOR TURNING OFF CRANK PINS, &c.
(Application filed July 19, 1899.)
(No Model.) 3 Sheets—Sheet 3.
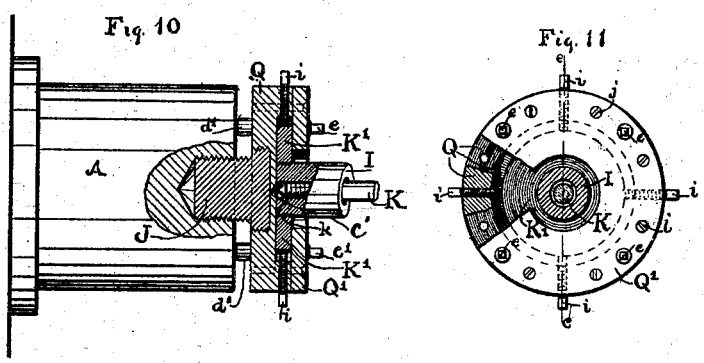
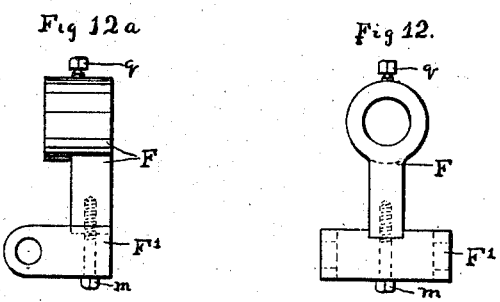
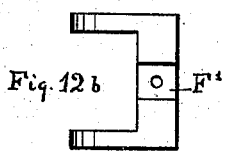
Witnesses:
Inventor:
Charles F. Owen

UNITED STATES PATENT OFFICE.

CHARLES F. OWEN, OF CHICAGO, ILLINOIS, ASSIGNOR TO CHARLES W. BROWN AND BENTON L. CLOVER, OF SAME PLACE.

MACHINE FOR TURNING OFF CRANK-PINS, &c.

SPECIFICATION forming part of Letters Patent No. 681,071, dated August 20, 1901.

Application filed July 19, 1899. Serial No. 724,352. (No model.)

*To all whom it may concern:*

Be it known that I, CHARLES F. OWEN, a resident of the city of Chicago, in the county of Cook and State of Illinois, have invented certain new and useful Improvements in Machines for Turning Off Crank-Pins or the Like, of which the following is a full, clear, and exact description, reference being had to the accompanying drawings, forming a part of this specification.

My invention belongs to that class of machine-tools known as "crank-pin" or "wrist-pin" turners. It has been my object to produce a portable turning-tool adjustably attachable to the outside end of the pin to be turned.

In some cases crank-pins have at their outer ends a lathe-center by which they were centered during their construction. In other cases the face of the pin is plane, presenting no aid in the matter of fixing the center. Some pins also are bored in the outer end for center oilers or for other purposes. Another class of pins are without an inside shoulder, which shoulder would be of much advantage in the designing and use of this class of appliances, and still another class of pins have no outside shoulder, being generally provided with a projecting stud by means of which a cap is secured to the head of the pin. Thus it will be seen that in providing a machine for the turning of crank or wrist pins a great variety of conditions are encountered. There are other difficulties besides—such, for instance, as careless workmanship in boring the ends of the pins for center oilers or for caps. A hole thus bored that is not centered accurately or that does not coincide with the alinement of the pin necessitates a reliable method for centering the apparatus that does not depend on a lathe-center left in the pin or on a centered plug turned into the hole. A device, therefore, to be of full availability must be one of the greatest range of adaptability.

It has been my aim to produce a device not only capable of universal attachment to all styles of pins, but one admitting of universal adjustment not only for centers but for alinement.

Figure 5:
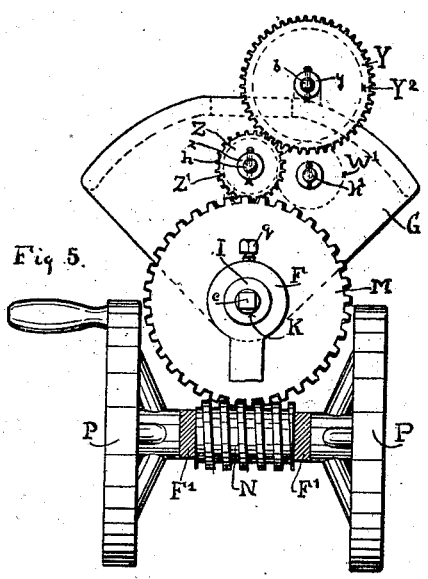
Figure 6:
Figures 7, 7A, 7B:
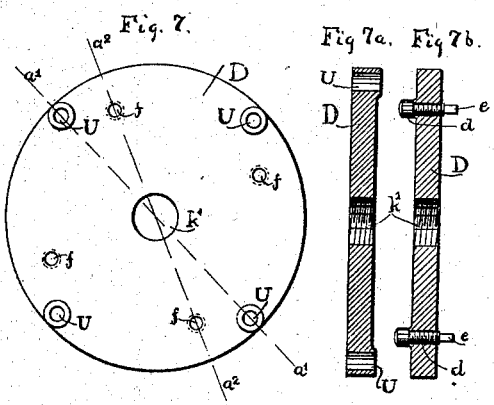
Figure 8:
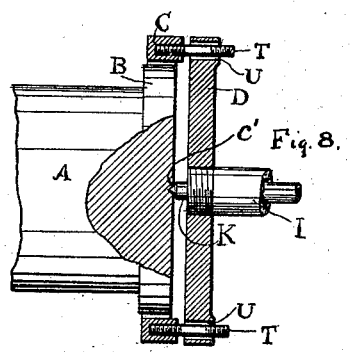
Figure 9:
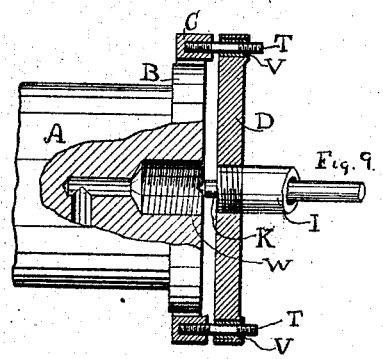

The following is an explanation of the drawings:

Figure 1 is a side elevation, and Fig. 2 a plan view, of the improved device attached to a common crank-pin having an outside shoulder. Figs. 3, 3ª, and 3ᵇ are detail views of the main chuck; Fig. 4, a front elevation of the tool-head; Fig. 5, a rear elevation of the driving mechanism at the back of the tool-head; Fig. 6, a view in longitudinal section showing the tubular support with its centering-stud in place; Fig. 7, a rear view of the supplemental chuck; Figs. 7ª and 7ᵇ, sectional views thereof on lines $a'$ $a'$ $a^2$ $a^2$ of Fig. 7, respectively; Fig. 8, a sectional view of the main and supplemental chucks, the tubular support and the centering-stud in place against the crank-pin; Fig. 9, a similar view with the parts sustained on a crank-pin having a hollow central opening; Fig. 10, a view similar to Fig. 9, but with the parts suitably modified to adapt them to a crank-pin devoid of an outside shoulder; Fig. 11, an elevation view, partly broken away, at rear of Fig. 10; Figs. 12 and 12ª, side and back views of bracket-collar and bearings for the worm drive-shaft; Fig. 12ᵇ, a top view of said shaft-bearings detached.

The following, taken in connection with the drawings, is such a full and explicit description of my invention as will enable any one skilled in the art to easily construct and apply my invention.

Referring to all the drawings except Figs. 10 and 11, A represents the pin to be operated on, and B is its outside shoulder. A support I carries the mechanism for operating on pin A, as will presently be described. Tubular support I is threaded at its front end to supplemental head D, which latter is adjustably attached in turn to the main chuck or head C. At quarter-points about its rim chuck C is furnished with clamp-screws R for securing it symmetrically on the end of the crank-pin. Set-screws S, working through the clamps R, tighten the hold and aid to firmly sustain the chuck C at set position upon the crank-pin. (See dotted line B', Fig. 3.) Holes U in supplemental head D loosely receive the threaded ends of corresponding posts T, projecting backward from main chuck C, Fig. 3$^a$. By means of nuts $v$ on said posts, Fig. 1, the main and supplemental heads C D are stoutly united together, while screw-studs $d$, Fig. 7$^b$, projecting forward from head D, are brought to bear against the face of the crank-pin and by suitable adjustment, as on the vernier-plate of a surveyor's theodolite, serve to aline the axes of the crank-pin and of the tubular support I, carried by head D. Support I carries running through its length a centering-stud K, having a threaded end $n$, enabling it to be turned in or out through I by means of its opposite end $c$. When pin A is provided with a lathe-center $c'$, as in Fig. 8, the head D may be clamped onto the chucking-head C closely enough to permit the screw-studs $d\,d$, &c., to bear on the face of the pin A, and then by turning up the centering-stud K into the lathe-center support I may be perfectly centered, after which the nuts $v\,v$, &c., on posts T T, &c., may be firmly screwed up. When pin A has no lathe-center, or when it is bored out for center oiler or for other purpose, another method of centering support I must be provided. In Fig. 9 are shown the ferrules V, which fit snugly into the holes U U, &c., in head D and which also fit snugly over posts T T, &c., in chucking-head C.

In the absence of a lathe-center on crank-pin A to work from the main chuck C can be accurately adjusted, as before, by means of the screws R S, while ferrules V serve to take up the play and without the aid of centering-stud K enable the supplemental head D to be brought into true alinement, together with tubular support I, under careful manipulation of the leveling-studs $d$. By either expedient, according to the peculiarity of the crank-pin under treatment, it is plain that the tubular support I is firmly sustained in exact position by the various adjustments of the main and supplemental chucks.

Support I carries upon it a tool-head, revolubly mounted upon it by means of the hollow spindle E. This tool-head consists of an upright bracket G, from which project over pin A wings or heads G' G$^2$, provided with slideways G$^3$ G$^4$, in which slideways is actuated the tool-post H. The two wings or heads G' G$^2$ are stiffened and prevented from vibration by a stiffening-piece $o$ across their outer ends, which piece $o$ is firmly secured to G' and G$^2$ by means of screws $l\,l$, as in Fig. 4. Tool-post H is provided with an internally-threaded lug X$^2$, through which feed-screw X turns. Feed-screw X is provided with the bearing X' on the bracket G and also carries gear Y and is further provided with a square end $b$, by which it may be readily and quickly turned. The tool $t$ is provided with slots $s$ and is firmly held in its slide-seat H' on the tool-post, being adjusted at will by loosening the nuts $r$ of bolts $u$, projected from the slide-seat through slots $s$. A hand-screw H$^2$, threaded to the post, engages the rear of slide-seat H' to regulate the cut of the tool, as usual. The spindle E, revolubly mounted on support I, is adjusted in its place on support I longitudinally and confined to any given or desired location by means of collars L and F, which are rigidly secured to support I by means of their respective set-screws $p$ and $q$. Collar L has affixed to it a gear-wheel $g$, with which meshes gear-wheel $a$, said gear-wheel $a$ being thus compelled to turn around on its own axis $h$ as the tool-head G revolves and carries it, $a$, around the fixed gear $g$. Gear-wheels $a$ and Z both being mounted on the same shaft or axis $h$, gear-wheel Z is actuated by gear-wheel $a$ and in turn actuates gear-wheel Y, with which it meshes, said gear-wheel Y being attached to the feed-screw shaft X. Gear-wheels Y and Z are provided with hubs $y$ and $z$, respectively, which hubs $y$ and $z$ are affixed, respectively, to feed-screw shaft X and shaft $h$ by means of cotters. When it is desired to reverse the motion of the feed-screw X, gears Y and Z may be removed, and gears respectively represented by the dotted lines Y$^2$ and Z' may be substituted in their places. On post $h'$ may then be placed a third gear, (represented by the dotted lines W',) which third gear will mesh with gears Y$^2$ and Z'. Gears having a very great variety in diameter ratio may thus be used, and I thus provide my movable tool-post H with an automatically-actuated feed-motion that is reversible, variable, and continuous.

Collar F is provided with a pendent portion, as seen in Fig. 12, to which is attached by the bolt $m$ the bracket F', which bracket F' carries the bearings for the driving-shaft O, as seen in Figs. 1, 2, and 5. Shaft O carries the worm N, in which meshes the worm-gear M. Worm-gear M, being affixed to the hollow spindle E, thus actuates said spindle E. Power-wheels P P are affixed to shaft O and may be turned by hand or by a small belt. Bracket F', carrying the driving-shaft O, being removably affixed to bracket F, worm N, and worm-gear M, will always easily be brought into mesh when assembling the device for operation.

Figs. 10 and 11 represent my invention as attached to a pin A, having no outside shoulder. In this case support I is provided with a head K', to which it is attached by its threaded end $k$, head K' being centrally bored and internally threaded to receive the said threaded end of I. Support I, with its head K', is provided with a chucking-head Q, removably attached. Chucking-head Q consists of a plate, containing on one side a circular recess of the same depth as the head K', but of somewhat greater diameter than head K'. Through the sides of head Q are the set-screws $i\,i$, &c., projecting through into the recess just described. Head K' being set into the recess in Q, set-screws $i\,i$, &c., bear against the sides of head K', as shown, so that the location of head K' with reference to chucking-head Q may be readily adjusted by said set-screws $i\ i$, &c. Chucking-head Q is provided with a cover-plate or cap Q', having a central aperture somewhat greater in diameter than the diameter of support I and secured to Q by screws $j\ j$, &c. Chucking-head Q is further provided with screw-studs $d'\ d'$, &c., which have heads adapted to be rested on the face of pin A, and opposite square ends $e\ e$, &c., by means of which they are adapted to be turned in or out through head Q, thus adjusting the inner face of Q relatively to the face of pin A. Chucking-head Q is also provided with a removable screw-stud J, adapted to be turned into the internally-threaded bore of pin A, thus holding chucking-head Q firmly to pin A. Should it be necessary to bring into use adjusting screw-studs $d'\ d'$, &c., screw-stud J may have one of its threaded ends fitted so as to be a little loose, thus forming a swivel connection and giving screw-studs $d'\ d'$, &c., sufficient range to accomplish the adjustment desired. Chucking-head Q is provided with a lathe-center $c'$ in its recess, so as to admit of the use of centering-stud K.

In case of a pin provided with a projecting stud the application of my device is essentially the same as shown in Figs. 10 and 11.

By the term "means for axially adjusting" as used in the following claims I wish to be understood as including means whereby the support for the revolving tool-carrier may be swung about a center in the plane of its axis for alining the support with the part to be operated upon in contradistinction to means for centering the support, which consist in shifting it bodily in a radial direction.

Having thus described my invention, what I claim as new, and desire to secure by Letters Patent, is—

1. In apparatus for turning off crank-pins and the like, the combination with a revoluble tool-carrier and with a support therefor, of a centering-stud longitudinally movable through said support and adjustable devices independent of said centering-stud for centering the support in the absence of a lathe-center or the like in the end of the pin to be operated upon.

2. In apparatus for turning off crank-pins and the like, the combination with a revoluble tool-carrier and with a support therefor, of a screw-threaded centering-stud longitudinally movable through said support and radially-movable screw-threaded adjustable devices for independently centering said support.

3. In apparatus for turning off crank-pins and the like, the combination with a revoluble tool-carrier and with a support therefor, of means at one end only of said support for carrying the same in operative position upon the outer end of the crank-pin to be operated upon and for adjusting the support bodily in radial direction when in operative position upon the crank-pin.

4. In apparatus for turning off crank-pins and the like, the combination with a revoluble tool-carrier and with a support therefor, of means at one end only of said support for carrying the same in operative position entirely upon the outer end of the crank-pin to be operated upon and for adjusting the support bodily in radial direction when in operative position upon the crank-pin, and means for axially adjusting said support when in operative position.

5. In apparatus for turning off crank-pins and the like, the combination with a support and with a revoluble tool-carrier and operating means therefor carried by said support, of means at one end only of said support for carrying the same in operative position entirely upon the outer end of the crank-pin to be operated upon, means for centering said support and means for axially adjusting said support when in operative position.

6. In apparatus of the character described, the combination with a chucking-head and with a supplemental head secured to said chucking-head and having a support projected therefrom, of means for adjustably securing said chucking-head to the part to be operated upon, and a revoluble tool-carrier and operating means therefor carried by said support.

7. In apparatus of the character described, the combination with a chucking-head and with a supplemental head having a support projected therefrom, of means for adjustably securing said chucking-head to the part to be operated upon, means for axially adjusting said supplemental head and said support, and a revoluble tool-carrier and operating means therefor carried by said support.

8. In apparatus for turning off crank-pins and the like, the combination with a revoluble tool-carrier and with a support therefor, of means for adjustably securing said support upon the crank-pin to be operated upon comprising radially-movable adjusting-screws and independent radially-movable clamping-screws.

9. In apparatus for turning off crank-pins and the like, the combination with a revoluble tool-carrier and with a support therefor, of a chucking-head for carrying said support upon the outer end of the crank-pin to be operated upon, said chucking-head being provided with radially-movable adjusting-screws and with radially-movable clamping-screws threaded through said adjusting-screws.

10. In apparatus of the character described, the combination with a chucking-head and with a supplemental head having a support projected therefrom, of means for centering said chucking-head and independent means for centering said supplemental head and support, and a revoluble tool-carrier and operating means therefor carried by said support.

11. In apparatus of the character described, the combination with a chucking-head and with a supplemental head having a support projected therefrom, of means for centering said chucking-head, means for axially adjusting said supplemental head and support, and a revoluble tool-carrier and operating means therefor carried by said support.

12. In apparatus of the character described, the combination with a chucking-head and with a supplemental head having a support projected therefrom, of means for centering said chucking-head, independent means for centering said supplemental head and said support, means for axially adjusting said supplemental head and said support, and a revoluble tool-carrier and operating means therefor carried by said support.

13. In apparatus for turning off crank-pins and the like, the combination with a chucking-head and with a supplemental head having a support projected therefrom, means for adjustably securing said heads and said support in operative position entirely upon the outer end of the crank-pin to be operated upon, means for axially adjusting said supplemental head and said support, and a revoluble tool-carrier and operating means therefor carried by said support.

14. In apparatus of the character described, the combination with a chucking-head and with a supplemental head having a support projected therefrom, of adjustable connections between said heads, radially-movable screws for centering said chucking-head, longitudinal adjustable screws for axially adjusting said supplemental head and said support, and a revoluble tool-carrier and operating means therefor carried by said support.

15. In apparatus of the character described, the combination with a chucking-head and with a supplemental head having a support projected therefrom, of adjustable connections between said heads, means for clamping said chucking-head to the outer end of the part to be operated upon, means for centering said supplemental head and said support, means for axially adjusting said supplemental head and said support, and a revoluble tool-carrier and operating means therefor carried by said support.

16. In apparatus of the character described, the combination with a chucking-head and with a supplemental head having a support projected therefrom, of adjustable connections between said heads, adjusting and clamping screws for adjustably clamping said chucking-head to the outer end of the part to be operated upon, a centering-stud longitudinally adjustable through said supplemental head and said support for centering said parts, and screws longitudinally adjustable through said supplemental head for axially alining said head and said support, and a revoluble tool-carrier and operating means therefor carried by said support.

17. In apparatus of the character described, the combination with a support, of a revoluble tool-carrier journaled on said support and provided with ways, a tool-post mounted on said ways, a feed-shaft for said tool-post, a gear fixed on said support and an interchangeable train of gearing between said gear and said feed-shaft.

18. In apparatus of the character described, the combination with a support provided at its inner end with means for carrying the same in operative position entirely upon the outer end of the part to be operated upon, of a revoluble tool-carrier and operating means therefor carried by said support, said tool-carrier being provided with suitable ways and a movable tool-post, a feed-screw for said tool-post, a gear fixed to said support and an interchangeable train of gears intermediate said support and said feed-screw.

CHARLES F. OWEN.

Witnesses:
ALBERTA ADAMICK,
GEO. P. FISHER, Jr.